US012461678B2

(12) United States Patent
Ito et al.

(10) Patent No.: US 12,461,678 B2
(45) Date of Patent: Nov. 4, 2025

(54) STORAGE SYSTEM INCLUDING STORAGE NODES EACH INCLUDING A STORAGE CONTROLLER CONFIGURED TO RUN ON A PROCESSOR

(71) Applicant: Hitachi, Ltd., Tokyo (JP)

(72) Inventors: Shintaro Ito, Tokyo (JP); Sachie Tajima, Tokyo (JP); Takahiro Yamamoto, Tokyo (JP); Yoshinori Ohira, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 88 days.

(21) Appl. No.: 18/461,997

(22) Filed: Sep. 6, 2023

(65) Prior Publication Data

US 2024/0377981 A1 Nov. 14, 2024

(30) Foreign Application Priority Data

May 10, 2023 (JP) ................................ 2023-077946

(51) Int. Cl.
*G06F 3/06* (2006.01)
(52) U.S. Cl.
CPC .......... *G06F 3/0655* (2013.01); *G06F 3/0614* (2013.01); *G06F 3/0683* (2013.01)
(58) Field of Classification Search
CPC .... G06F 3/0655; G06F 3/0614; G06F 3/0683; G06F 3/0689
See application file for complete search history.

(56) References Cited

U.S. PATENT DOCUMENTS

| 10,083,100 | B1 | 9/2018 | Agetsuma et al. | |
|---|---|---|---|---|
| 2012/0124294 | A1* | 5/2012 | Atkisson | G06F 12/0804 711/135 |
| 2018/0032440 | A1* | 2/2018 | Iyer | G06F 12/1027 |
| 2022/0156396 | A1* | 5/2022 | Bednash | G06F 21/554 |
| 2022/0215001 | A1* | 7/2022 | P S | G06F 11/2097 |
| 2022/0222015 | A1* | 7/2022 | Sakai | G06F 3/0635 |
| 2023/0195535 | A1* | 6/2023 | Pabón | G06F 9/455 718/104 |
| 2023/0236980 | A1* | 7/2023 | Fang | G06F 12/084 711/141 |
| 2024/0069742 | A1* | 2/2024 | McGee | G06F 3/0647 |

FOREIGN PATENT DOCUMENTS

JP 2019-101703 A 6/2019

* cited by examiner

*Primary Examiner* — Tim T Vo
(74) *Attorney, Agent, or Firm* — Procopio, Cory, Hargreaves & Savitch LLP

(57) ABSTRACT

A storage system having both a high performance and high reliability is implemented. The storage system includes a plurality of storage nodes each including a processor and a memory, and a storage device. Each of the plurality of storage nodes includes a storage controller configured to run on the processor, the plurality of storage controllers include an active storage controller configured to process data output to and received from the storage device, and a standby storage controller configured to take over the processing of the data from the active storage controller, each of the active storage controller and the standby storage controller is allocated with a storage area of the memory, and the storage node changes an amount of a memory capacity allocated for the storage controller of the self-node when a state of the storage controller is switched between a standby state and an active state.

9 Claims, 27 Drawing Sheets

SYSTEM CONFIGURATION DIAGRAM

MEMORY CONFIGURATION DIAGRAM

FIG. 6
CACHE DIRECTORY

| CACHE ADDRESS | LOGICAL VOLUME NUMBER | LOGICAL VOLUME ADDRESS | ATTRIBUTE |
|---|---|---|---|
| 0 | 1 | 1024 | Dirty |
| 1 | - | - | - |
| 2 | 32 | 50876 | Dirty |
| 3 | 1 | 4 | Clean |
| ... | ... | ... | |

FIG. 7

CACHE ALLOCATION CAPACITY MANAGEMENT TABLE

| NODE ID | REDUNDANCY GROUP ID | ACTIVE/STANDBY STATE | ALLOCATED CACHE CAPACITY | TARGET CACHE CAPACITY | CLEAN CACHE USAGE AMOUNT | DIRTY CACHE USAGE AMOUNT | UNUSED CACHE AMOUNT |
|---|---|---|---|---|---|---|---|
| 0 | 0 | Active | 80GB | - | 40GB | 20GB | 0GB |
| 0 | 9 | Standby | 40GB | - | 10GB | 5GB | 5GB |
| 1 | 1 | Active | 100GB | - | 80GB | 20GB | 0GB |
| 1 | 0 | Standby | 25GB | - | 5GB | 20GB | 0GB |
| 2 | 2 | Active | 95GB | - | 40GB | 50GB | 5GB |
| 2 | 1 | Standby | 20GB | - | 5GB | 20GB | 0GB |
| ... | ... | ... | ... | ... | ... | ... | |

FIG. 8

FREE CACHE CAPACITY MANAGEMENT TABLE

| NODE ID | TOTAL CACHE CAPACITY | ALLOCATED CACHE CAPACITY | FREE CACHE CAPACITY |
|---|---|---|---|
| 0 | 120GB | 120GB | 0GB |
| 1 | 120GB | 40GB | 80GB |
| 2 | 120GB | 100GB | 20GB |
| ... | ... | ... | ... |

READ PROCESSING

FAILOVER PROCESSING

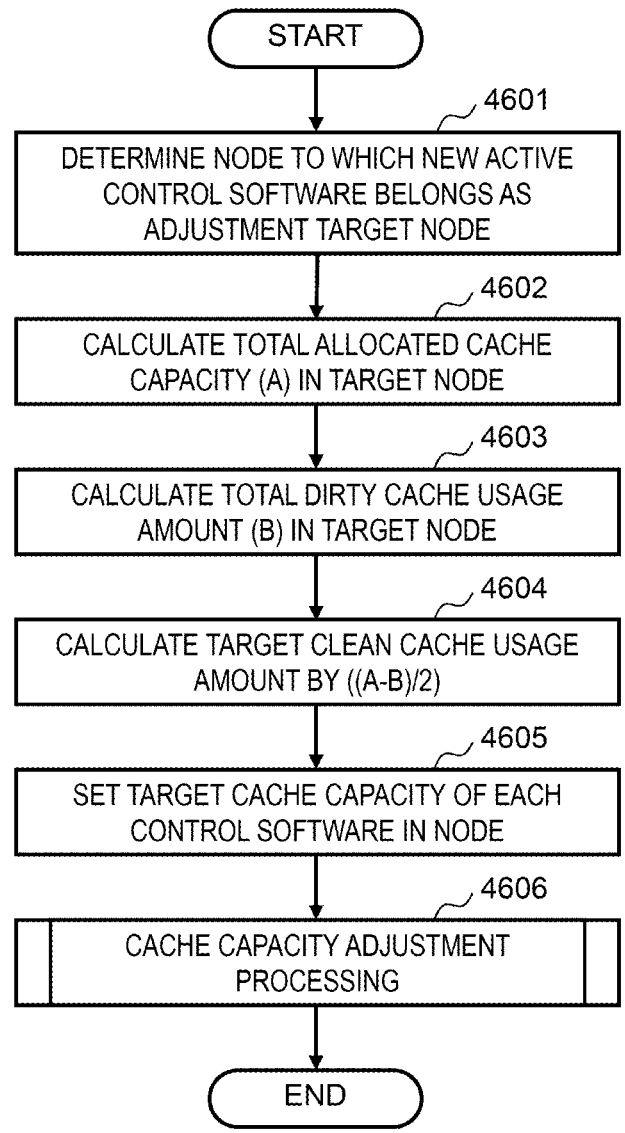

FIG. 16

CACHE ALLOCATION CAPACITY MANAGEMENT TABLE
(WHEN ADJUSTMENT AFTER FAILOVER)

| NODE ID | REDUNDANCY GROUP ID | ACTIVE/STANDBY STATE | ALLOCATED CACHE CAPACITY | TARGET CACHE CAPACITY | CLEAN CACHE USAGE AMOUNT | DIRTY CACHE USAGE AMOUNT | UNUSED CACHE AMOUNT |
|---|---|---|---|---|---|---|---|
| 0 | 0 | Active | 80GB | - | 40GB | 20GB | 0GB |
| 0 | 9 | Standby | 40GB | - | 10GB | 5GB | 5GB |
| 1 | 1 | Active | 100GB | 50GB | 80GB | 20GB | 0GB |
| 1 | 0 | Standby ⇒Active | 25GB | 50GB | 5GB | 20GB | 0GB |
| 2 | 2 | Active | 95GB | - | 40GB | 50GB | 5GB |
| 2 | 1 | Standby | 25GB | - | 5GB | 20GB | 0GB |
| ... | ... | ... | ... | ... | ... | | |

FIG. 19
CACHE ALLOCATION CAPACITY MANAGEMENT TABLE

| NODE ID | REDUNDANCY GROUP ID | ACTIVE/STANDBY STATE | ALLOCATED CACHE CAPACITY | TARGET CACHE CAPACITY | CLEAN CACHE USAGE AMOUNT | DIRTY CACHE USAGE AMOUNT | UNUSED CACHE AMOUNT |
|---|---|---|---|---|---|---|---|
| 0 | 0 | Active | 40GB | - | 20GB | 20GB | 0GB |
| 0 | 9 | Standby1 | 40GB | - | 10GB | 5GB | 5GB |
| 0 | 10 | Standby2 | 40GB | - | 30GB | 0GB | 10GB |
| 1 | 1 | Active | 65GB | - | 45GB | 20GB | 0GB |
| 1 | 10 | Standby1 | 25GB | - | 5GB | 20GB | 0GB |
| 1 | 10 | Standby2 | 30GB | - | 15GB | 15GB | 0GB |
| 2 | 2 | Active | 75GB | - | 40GB | 50GB | 5GB |
| 2 | 1 | Standby1 | 20GB | - | 5GB | 20GB | 0GB |
| 2 | 0 | Standby2 | 20GB | - | 10GB | 10GB | 0GB |
| ... | ... | ... | ... | ... | ... | ... | |

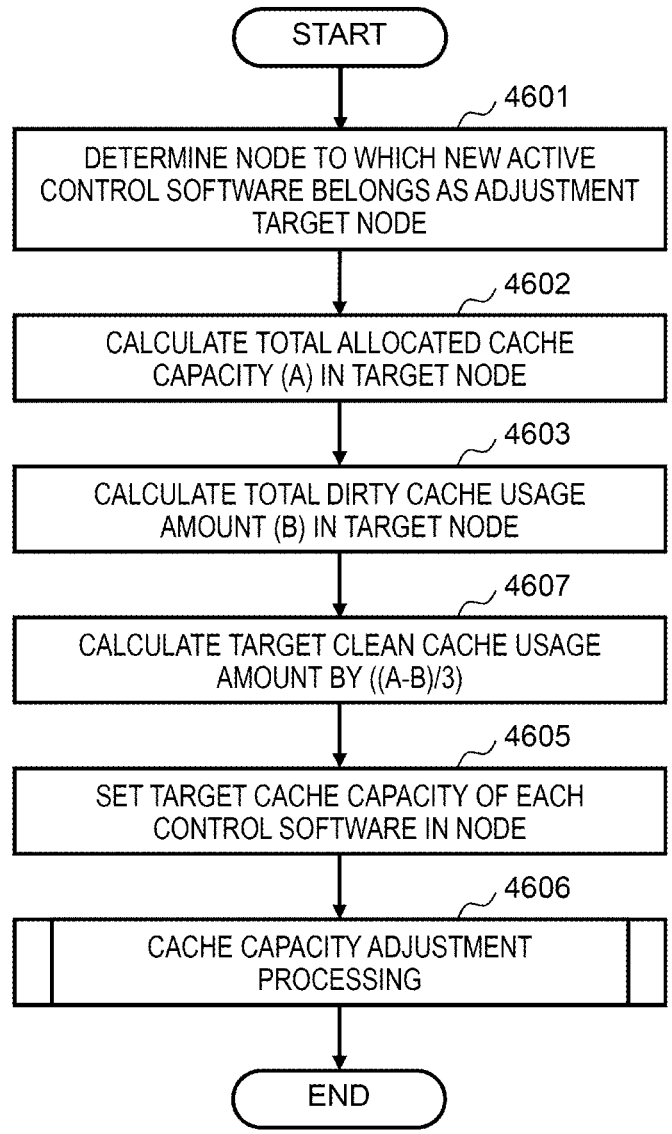

FIG. 22

CACHE ALLOCATION CAPACITY MANAGEMENT TABLE

| NODE ID | REDUNDANCY GROUP ID | ACTIVE/STANDBY STATE | ALLOCATED CACHE CAPACITY | TARGET CACHE CAPACITY | CLEAN CACHE USAGE AMOUNT (USER DATA) | CLEAN CACHE USAGE AMOUNT (METADATA) | DIRTY CACHE USAGE AMOUNT (USER DATA) | DIRTY CACHE USAGE AMOUNT (METADATA) | UNUSED CACHE AMOUNT |
|---|---|---|---|---|---|---|---|---|---|
| 0 | 0 | Active | 40GB | - | 10GB | 10GB | 10GB | 10GB | 0GB |
| 0 | 9 | Standby1 | 40GB | - | 5GB | 5GB | 20GB | 5GB | 5GB |
| 1 | 1 | Active | 65GB | - | 40GB | 5GB | 10GB | 10GB | 0GB |
| 1 | 0 | Standby1 | 25GB | - | 0GB | 5GB | 10GB | 10GB | 0GB |
| 2 | 2 | Active | 75GB | - | 40GB | 5GB | 20GB | 5GB | 5GB |
| 2 | 1 | Standby1 | 20GB | - | 0GB | 0GB | 10GB | 10GB | 0GB |
| ⋮ | ⋮ | ⋮ | ⋮ | ⋮ | ⋮ | | | | |

CACHE CAPACITY CHANGE PROCESSING AT TIME OF FAILOVER

FIG. 24

CACHE ALLOCATION CAPACITY MANAGEMENT TABLE

| NODE ID | REDUNDANCY GROUP ID | ACTIVE/STANDBY STATE | ALLOCATED CACHE CAPACITY | TARGET CACHE CAPACITY | CLEAN CACHE USAGE AMOUNT | DIRTY CACHE USAGE AMOUNT | CACHE HIT RATE | UNUSED CACHE AMOUNT |
|---|---|---|---|---|---|---|---|---|
| 0 | 0 | Active | 80GB | - | 40GB | 20GB | 20% | 0GB |
| 0 | 9 | Standby | 40GB | - | 10GB | 5GB | - | 5GB |
| 1 | 1 | Active | 100GB | - | 80GB | 20GB | 10% | 0GB |
| 1 | 0 | Standby | 25GB | - | 5GB | 20GB | - | 0GB |
| 2 | 2 | Active | 95GB | - | 40GB | 50GB | 80% | 5GB |
| 2 | 1 | Standby | 20GB | - | 5GB | 20GB | - | 0GB |
| ⋮ | ⋮ | ⋮ | ⋮ | ⋮ | ⋮ | ⋮ | ⋮ | ⋮ |

FAILBACK PROCESSING

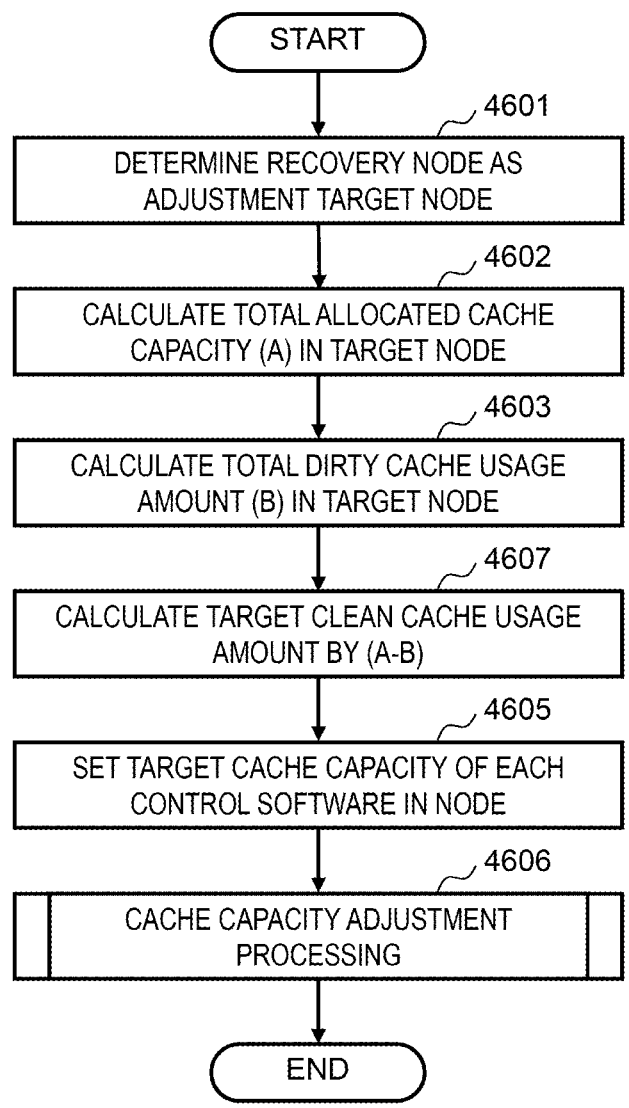

STORAGE SYSTEM INCLUDING STORAGE NODES EACH INCLUDING A STORAGE CONTROLLER CONFIGURED TO RUN ON A PROCESSOR

BACKGROUND OF THE INVENTION

1. Field of the Invention

The present invention relates to a storage system and a memory management method.

2. Description of Related Art

In the related art, in a storage system, a redundancy configuration is adopted to improve availability and reliability.

For example, PTL 1 proposes the following storage system.

In a storage system including a plurality of storage nodes, each of the storage nodes includes one or a plurality of storage devices which respectively provide a storage area; and one or a plurality of storage controllers each of which reads and writes requested data from and into a corresponding storage device in response to a request from a higher-level device. Each of the storage controllers retains predetermined configuration information required for reading and writing the requested data from and into the corresponding storage device in response to a request from the higher-level device. A plurality of control software are managed as a redundancy group, and the configuration information retained in each of the control software belonging to the same redundancy group is synchronously updated. The plurality of control software configuring the redundancy group are each located in different storage nodes to distribute a load of each of the storage nodes.

CITATION LIST

Patent Literature

PTL 1: JP2019-101700

SUMMARY OF THE INVENTION

According to PTL 1, by using a technique (software defined storage: SDS) for constituting a storage system by software, it is possible to constitute a storage system capable of continuing reading and writing even at the time of a node failure. PTL 1 discloses a technique for improving availability of storage control software while efficiently using a server by deploying active storage control software belonging to a certain redundancy group and standby storage control software belonging to another redundancy group on the same server.

In addition, PTL 1 discloses that information on a memory necessary for controlling the storage control software is made redundant between the active storage control software and the standby storage control software. The information on the memory includes cache data.

However, the cache data includes data that requires redundancy and data that does not require redundancy, and when all of the data are made redundant without distinction and then a capacity for that purpose is reserved for the standby control software, the capacity efficiency of the memory deteriorates.

In order to achieve the above object, one representative storage system according to the invention includes a plurality of storage nodes each including a processor and a memory, and a storage device, each of the plurality of storage nodes includes a storage controller configured to run on the processor, the plurality of storage controllers include an active storage controller configured to process data output to and received from the storage device, and a standby storage controller configured to take over the processing of the data from the active storage controller, each of the active storage controller and the standby storage controller is allocated with a storage area of the memory, and the storage node changes an amount of a memory capacity allocated for the storage controller of the self-node when a state of the storage controller is switched between a standby state and an active state.

Further, one representative memory management method according to the invention is a memory management method of a storage system including a plurality of storage nodes each including a processor and a memory, and a storage device, each of the plurality of storage nodes includes a storage controller configured to run on the processor, the plurality of storage controllers include an active storage controller configured to process data output to and received from the storage device, and a standby storage controller configured to take over the processing of the data from the active storage controller, each of the active storage controller and the standby storage controller is allocated with a storage area of the memory, and the memory management method includes: switching a state of the storage controller between a standby state and an active state by the storage node; and changing, by the storage node, allocation of a memory capacity for a plurality of the storage controllers of the self-node.

According to the invention, it is possible to implement a storage system having both high performance and high reliability. Problems, configurations, and effects other than those described above will be clarified by the following description of embodiments.

BRIEF DESCRIPTION OF THE DRAWINGS

FIG. 6 shows an example of a cache directory;
FIG. 7 shows an example of a cache allocation capacity management table;
FIG. 8 shows an example of a free cache capacity management table;
FIG. 15 is a flowchart of cache capacity change processing at the time of failover;
FIG. 16 shows an example of updating the cache allocation capacity management table;

FIG. 19 shows an example of a cache allocation capacity management table in a case of triplication;

FIG. 20 shows cache capacity change processing at the time of failover in the case of triplication;

FIG. 22 shows an example of a cache allocation capacity management table for managing metadata;

FIG. 24 shows an example of a cache allocation capacity management table for managing a cache hit rate;

FIG. 27 is a flowchart of cache capacity change processing at the time of failback.

DESCRIPTION OF EMBODIMENTS

Hereinafter, embodiments of the invention will be described with reference to the drawings. The embodiments relate to a storage system including a plurality of storage nodes in which one or more SDSs are installed, for example.

In the embodiments to be disclosed, each storage node stores control information and caches data in a memory. The storage node includes a non-volatile device. When control information and data are updated in response to a write request from a host, the update data is stored in the non-volatile device in a log format to respond to the host. At this time, the control information and the data are stored in an additional write format.

Embodiment 1

(1) Embodiment 1

(1-1) Configuration of Storage System According to Embodiment 1

Figure 1:
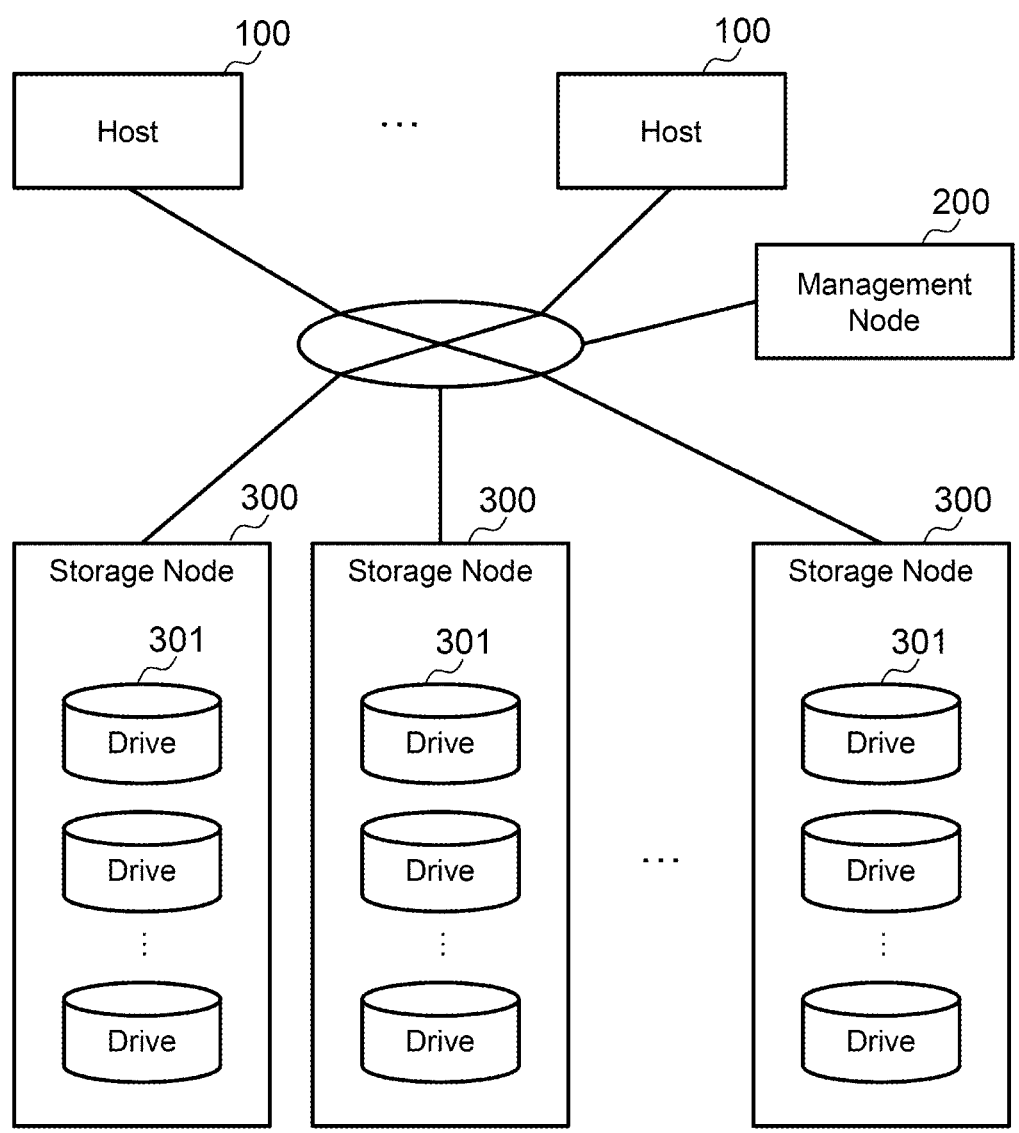
FIG. 1 shows an overall configuration of a storage system according to Embodiment 1.

FIG. 1 shows a storage system according to Embodiment 1 as a whole.

The storage system includes, for example, a plurality of hosts 100, a plurality of storage nodes 300, and a management node 200. The hosts 100, the storage nodes 300, and the management node 200 are connected to one another via a network implemented by a fiber channel, Ethernet (registered trademark), a local area network (LAN), and the like.

The host 100 is a general-purpose computer that transmits a read request or a write request (hereinafter collectively referred to as an input/output (I/O) request) to the storage nodes 300 in response to a user operation or a request from an installed application program or the like. The host 100 may be a virtual computer such as a virtual machine.

The storage node 300 is a computer that provides a storage area for the host 100 to read and write data. The storage node 300 is, for example, a general-purpose server.

The management node 200 is a computer used for managing the entire storage system by a system administrator. The management node 200 manages the plurality of storage nodes 300 as a group called a cluster. FIG. 1 shows an example in which only one cluster is provided, and a plurality of clusters may be provided in the storage system.

Figure 2:
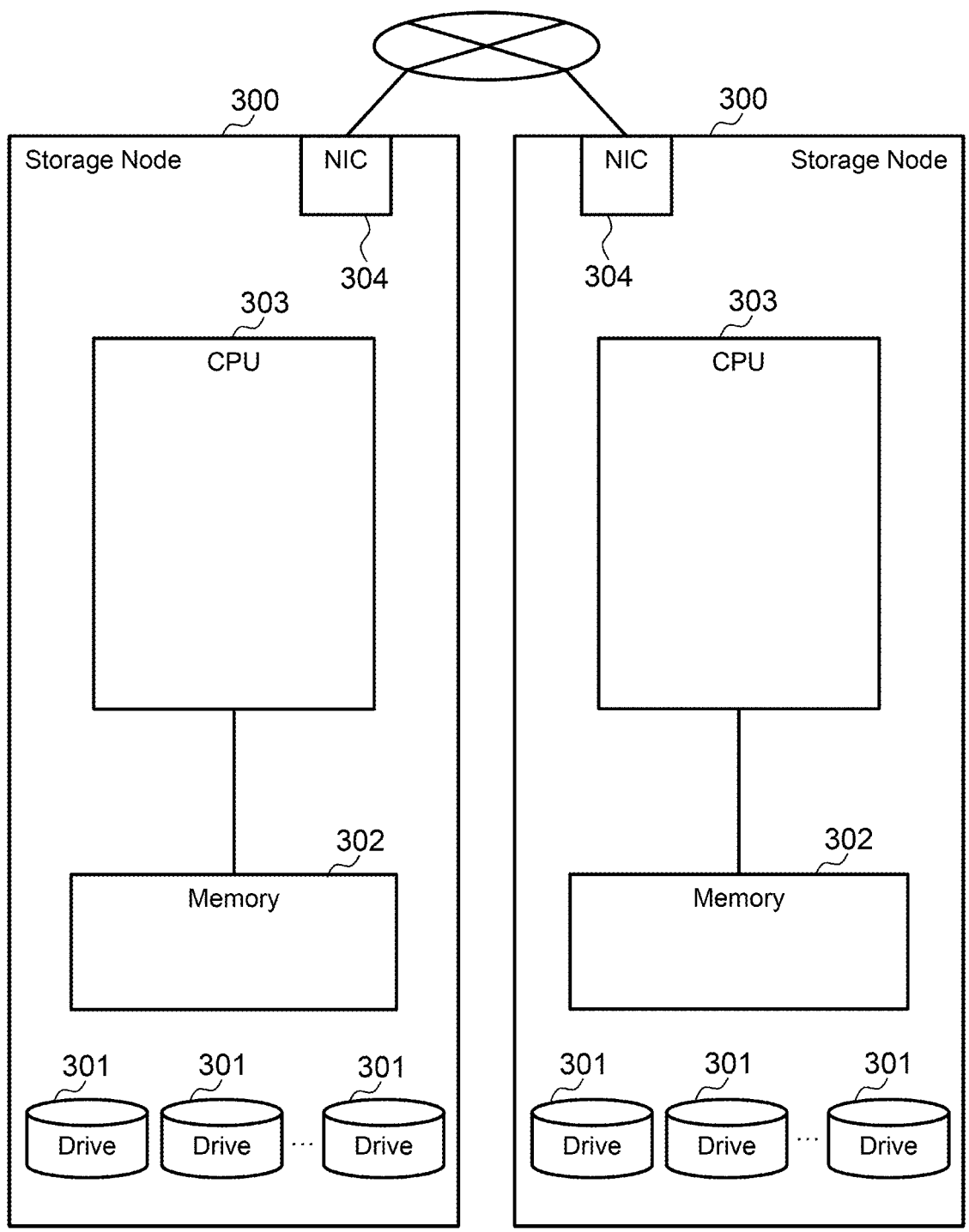
FIG. 2 shows a physical configuration of a storage node.

FIG. 2 is a diagram showing an example of a physical configuration of the storage node 300.

The storage node 300 includes a central processing unit (CPU) 303, a memory 302, a plurality of drives 301, and a communication device (NIC: network interface card) 304.

The CPU 303 is a processor that controls an operation of the entire storage node 300. The memory 302 is implemented by a semi-conductor memory such as a static random access memory (RAM) (SRAM) and a dynamic RAM (DRAM). The memory 302 is used to temporarily store various programs and necessary data. The CPU 303 executes the programs stored in the memory 302, thereby executing various types of processing of the entire storage node 300, as to be described later.

The drive 301 includes one or a plurality of types of large-capacity non-volatile storage devices such as a solid state drive (SSD), a serial attached small computer system interface (SCSI) (SAS) hard disc drive, and a serial advanced technology attachment (ATA) (SATA) hard disc drive. The drive 301 provides a physical storage area for reading or writing data in response to an I/O request from the host 100.

The communication device 304 is an interface for the storage node 300 to communicate with the host 100, another storage node 300, or the management node 200 via the network. The communication device 304 includes, for example, an NIC and an FC card. The communication device 304 performs protocol control during communication with the host 100, another storage node 300, or the management node 200.

Figure 3:
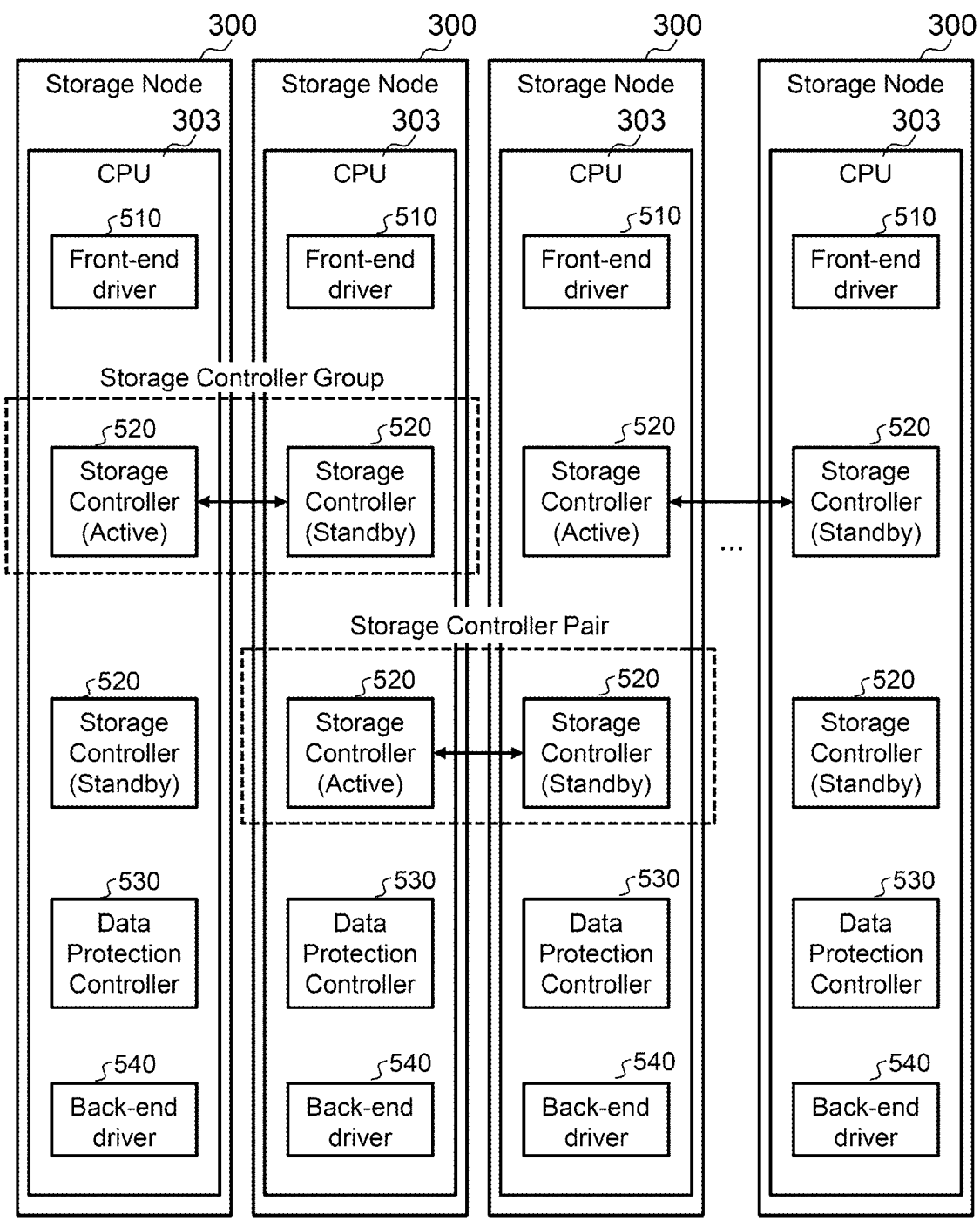
FIG. 3 shows a logical configuration of the storage node.

FIG. 3 is a diagram showing an example of a logical configuration of the storage node.

The storage node 300 includes a front-end driver 510, a back-end driver 540, one or a plurality of storage controllers 520, and a data protection controller 530.

The front-end driver 510 is software having a function of controlling the communication device 304 and providing the CPU 303 with an abstracted interface for the storage controller 520 when the storage controller 520 communicates with the host 100, another storage node 300, or the management node 200.

The back-end driver 540 is software having a function of controlling each drive in an own storage node and providing the CPU 303 with an abstracted interface when the CPU 303 communicates with each drive.

The storage controller 520 is software that functions as an SDS controller, that is, control software. The storage controller 520 receives an I/O request from the host 100 and issues an I/O command corresponding to the I/O request to the data protection controller. The storage controller 520 has a logical volume configuration function. The logical volume configuration function associates a logical chunk configured with the data protection controller 530 with a logical volume provided to the host 100. For example, a straight mapping method (a logical chunk and a logical volume are associated with each other at a ratio of 1:1, and an address of the logical chunk and an address of the logical volume are the same) or a thin provisioning method (a method in which a logical volume and a logical chunk are divided into small size areas (pages), and addresses of the logical volume and the logical chunk are associated with each other in units of pages) may be adopted.

In a case of Embodiment 1, each storage controller 520 installed in the storage node 300 is managed, together with another storage controller 520 located in another storage node 300, as a pair configuring a redundancy configuration. Hereinafter, the pair is referred to as a storage controller group.

FIG. 3 shows a case in which one storage controller group includes two storage controllers 520.

In the storage controller group, one of the storage controllers 520 is set to a state (an active state, hereinafter referred to as active mode) in which the storage control controller 520 can receive the I/O request from the host device 100. In the storage controller group, the other storage control module 520 is set to a state (a standby state, hereinafter referred to as standby mode) in which the other storage controller 520 cannot receive the I/O request from the host 100.

In the storage controller group, when a failure occurs in the storage controller set to the active mode (hereinafter, referred to as an active storage controller) or the storage node in which the active storage controller is located, the state of the storage controller set to the standby mode (hereinafter, referred to as a standby storage controller) until then is switched to the active mode.

Accordingly, when the active storage controller cannot operate, I/O processing executed by the active storage controller can be taken over by the standby storage controller.

The data protection controller 530 is software having a function of allocating a physical storage area provided by the drive in the own storage node or another storage node to each storage controller group, and reading or writing specified data to a corresponding drive according to the above described I/O command from the storage controller.

In this case, when allocating the physical storage area provided by the drive in another storage node to the storage controller group, the data protection controller 530 reads or writes the data from and to the storage area according to the I/O command from the active storage controller of the storage controller group by cooperating with the data protection controller 530 installed in the other storage node and exchanging data with the data protection controller 530 via the network.

Figure 4:
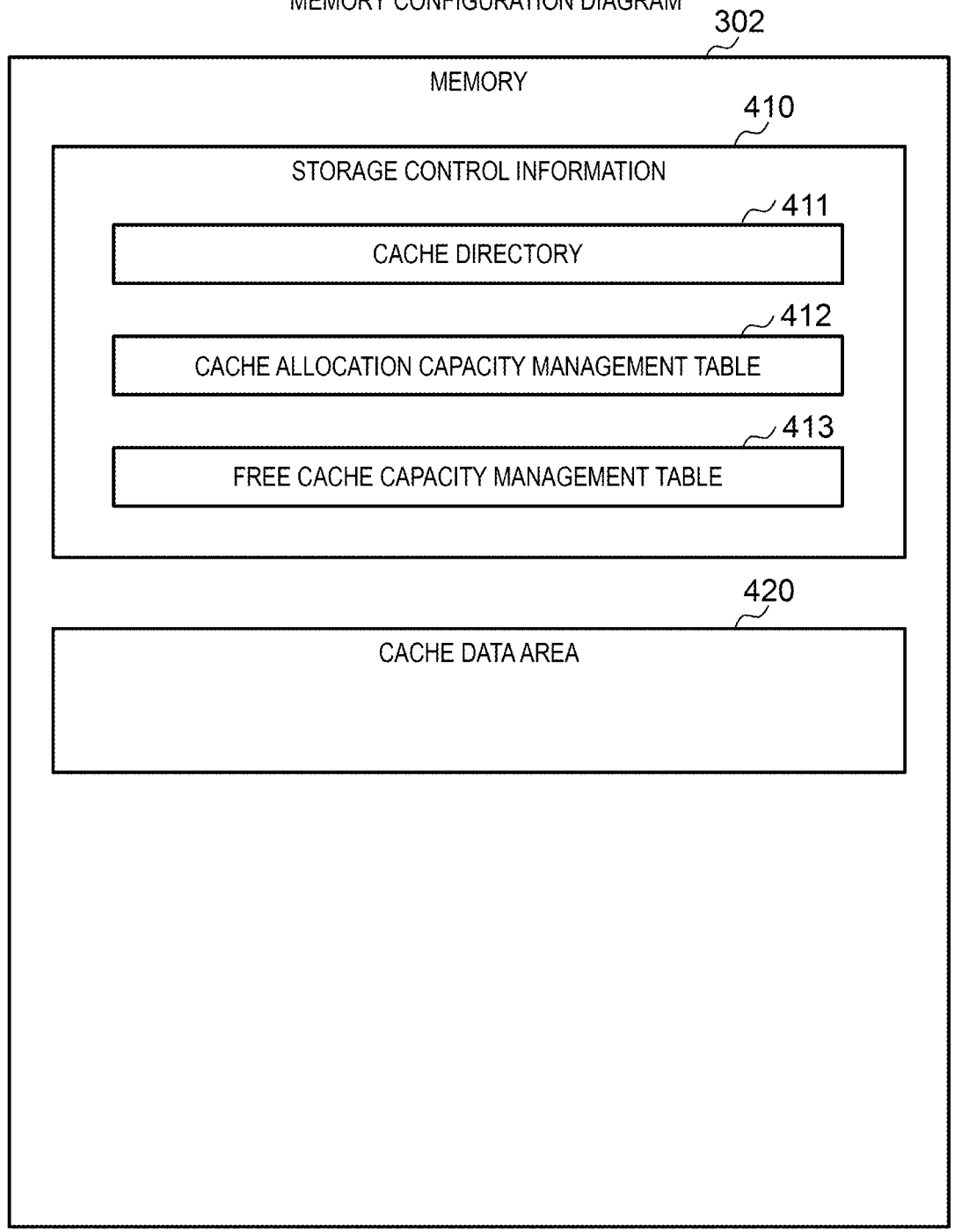
FIG. 4 is a configuration diagram of a memory.

FIG. 4 shows an example of a configuration of the memory. Storage control information 410 and a cache data area 420 are stored in the memory.

The storage control information 410 is an area in which control information for implementing various storage functions is stored, and examples thereof include a cache directory 411, a cache allocation capacity management table 412, and a free cache capacity management table 413. The cache directory 411 is illustrated in FIG. 6, the cache allocation capacity management table 412 is illustrated in FIG. 7, and the free cache capacity management table 413 is illustrated in FIG. 8.

Figure 5:
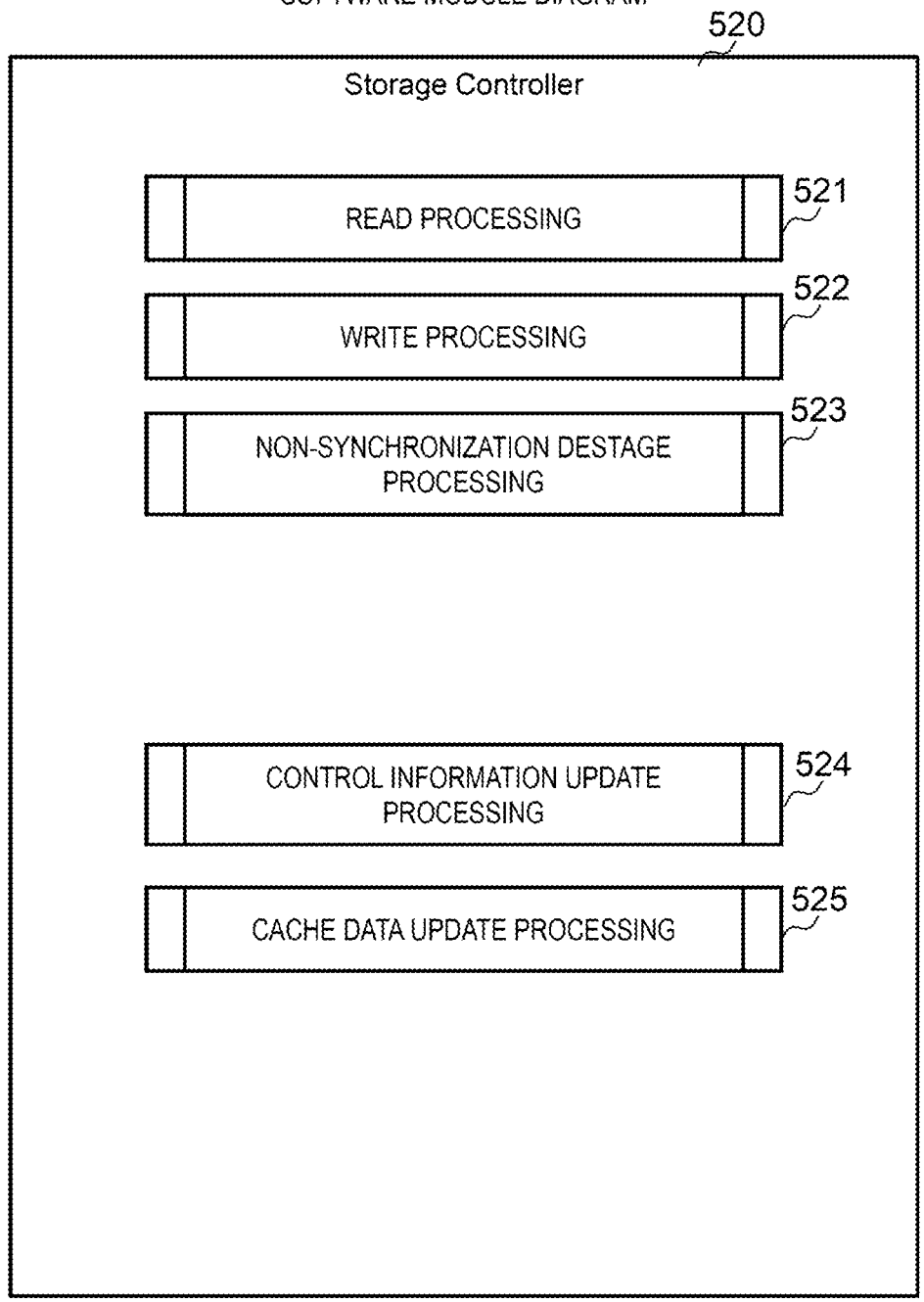
FIG. 5 shows a software module structure of a storage controller.

FIG. 5 is a diagram showing an example of a software module structure of the storage controller 520.

The storage controller 520 executes control information update processing 524, cache data update processing 525, read processing 521, write processing 522, and non-synchronization destage processing 523. Details of respective processing will be described later.

Hereinafter, the control information will be described. FIG. 6 is a diagram showing an example of the cache directory 411. The cache directory 411 is management information on an area (cache segments) obtained by subdividing a cache area, and has an entry corresponding to each cache segment.

Each entry includes a cache address, a logical volume number, a logical volume address, and an attribute entry. The cache address indicates an address of a cache segment on the memory corresponding to each entry. The logical volume number and the logical volume address indicate which logical volume and which address data stored in the cache segment is located. When no data is stored in the cache segment, "-" indicating "no value" is stored. When data is stored in the cache segment, a value of "Dirty" or "Clean" is stored in an attribute field. "Dirty" indicates that the data is not destaged and is not written in the drive, and "Clean" indicates that the data is destaged and matches a value written in the drive.

FIG. 7 shows the cache allocation capacity management table 412. The cache allocation capacity management table 412 has an entry for each storage controller 520 configuring each redundancy group of all nodes, and each entry has fields of a node ID, a redundancy group ID, an Active/Standby state, an allocated cache capacity, a target cache capacity, a clean cache usage amount, a dirty cache usage amount, and an unused cache amount. The node ID indicates a node in which the storage controller 520 is located, the redundancy group ID indicates the redundancy group to which the storage controller 520 belongs, and the Active/Standby state indicates an Active/Standby state of each storage controller 520. The allocated cache capacity indicates a logical capacity allocated to the storage controller 520 from the memory in the node, and the clean cache usage amount and the dirty cache usage amount indicate capacities used for clean data and dirty data among the allocated cache capacities. The unused cache amount is a free cache capacity that is not used in the clean cache and the dirty cache in an allocated cache capacity.

The dirty cache is a cache that stores data to be written to the storage device (drive 301). At the time of write, the storage controller 520 temporarily stores write data in the cache and then stores the write data in the storage device. Therefore, the storage device has no data same as the dirty data (=dirty). Since redundancy is made, the dirty cache is stored in the same manner in both the active mode and the standby mode.

The clean cache is a cache that stores data read from the storage device (drive 301). At the time of read, the storage controller 520 reads read data from the storage device, stores the read data in the cache, and transfers the read data to a read request source. When the data is stored in the cache for a predetermined period and is read again, the data is read from the cache and transferred. Therefore, in the clean cache, the same data exists in the storage device (=clean).

Since the read is a work of the active storage controller in principle, it is preferable that there is more clean cache in the active storage controller.

The active storage controller and the standby storage controller belonging to the same redundancy group have the same dirty cache usage amount since the dirty cache is made redundant. On the other hand, since the clean cache is held to improve a response performance of the active storage controller, the clean cache usage amount of the standby storage controller may be smaller than the clean cache usage amount of the active storage controller belonging to the same redundancy group. For example, the dirty cache usage amount in the redundancy group ID0 is 20 GB for both the active storage controller and the standby storage controller. On the other hand, the clean cache usage amount in the redundancy group ID0 is 40 GB for the active storage controller, and 5 GB for the standby storage controller.

The dirty cache usage amount and the clean cache usage amount are adjusted based on the target cache capacity. The target cache capacity will be described in cache capacity adjustment processing (FIG. 17) to be described later.

For a cache capacity allocated to the active storage controller, the cache allocation capacity for the standby storage controller configuring the same redundancy group may be reduced. The reason is that, as will be described later, the clean cache does not necessarily need to be made redundant, and it is unnecessary to ensure the capacity on a standby storage controller side. Thus, the memory capacity efficiency can be improved.

FIG. 8 shows a free cache capacity management table. The free cache capacity management table 413 has an entry corresponding to each node, and each entry has fields of a node ID, a total cache capacity, an allocated cache capacity, and a free cache capacity.

Figure 9:
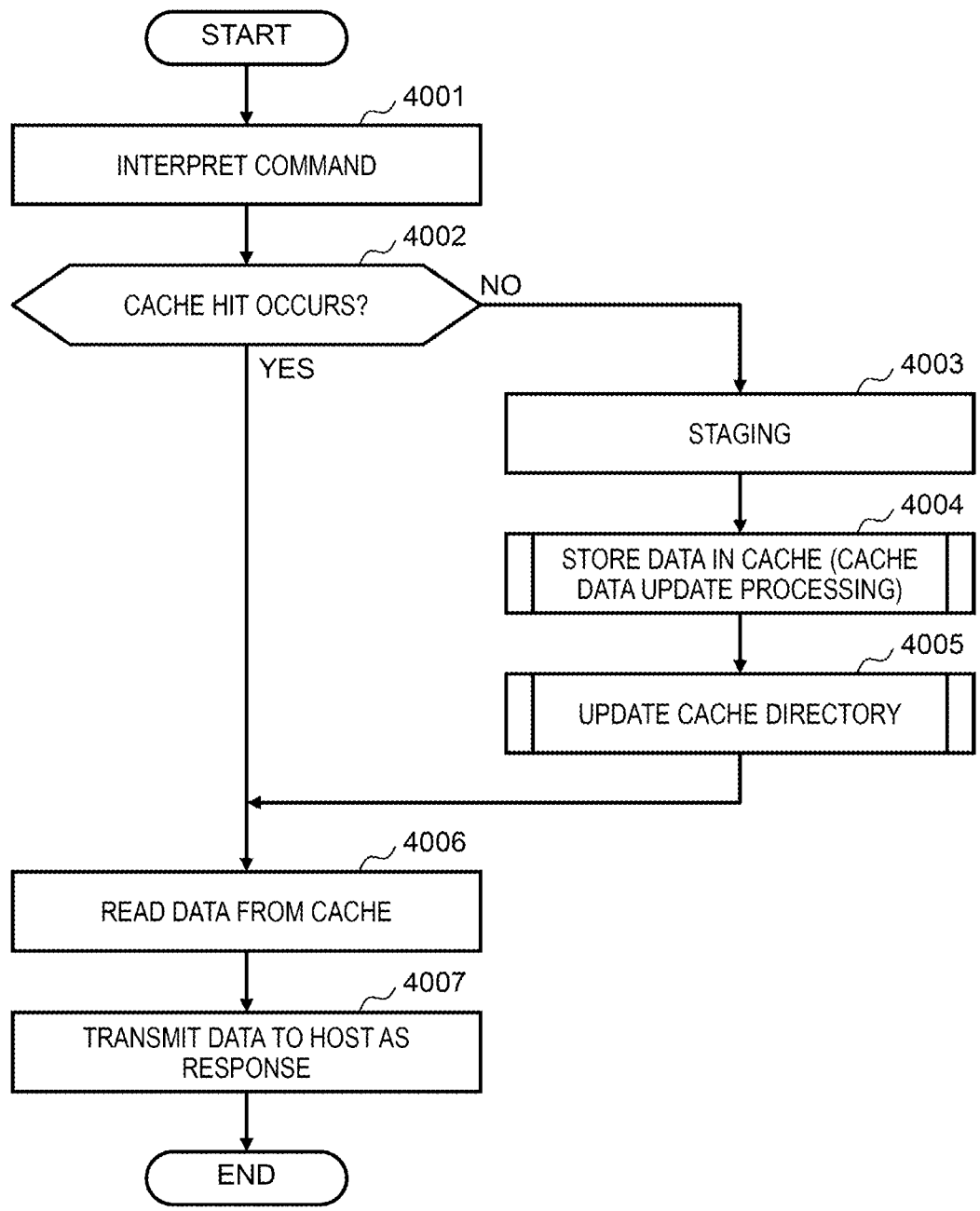
FIG. 9 is a flowchart of read processing.

FIG. 9 is a flowchart showing an example of the read processing. The read processing 521 is called when a read I/O command is received from the host, and is executed by the storage controller 520. First, a read command transmitted from the host 100 is received via the front-end driver 510 and interpreted to obtain a logical volume number and a logical volume address to be read (step 4001). Next, it is determined whether a cache hit occurs (step 4002). Specifically, with reference to the cache directory 411, an entry corresponding to the logical volume number and logical volume address is searched for in the cache directory 411, and if there is the entry (hit), the cache address is referenced from the entry, processing proceeds to a branch of Yes to read the data from the cache area (step 4006), and then the data is transmitted to the host 100 (step 4007).

If there is no entry corresponding to the logical volume number and the logical volume address in the cache directory 411 (miss), the processing proceeds to a branch of No, and staging processing is called (step 4003). The staging processing is processing executed by the data protection controller 530, and data corresponding to the logical volume number/the logical volume address is read from a permanent area on the drive. The read data is stored in the cache data area 420 on the memory 302 (step 4004). At this time, the cache data update processing to be described later is called by setting redundancy necessity to "unnecessary". The cache directory 411 is updated (step 4005). At this time, since the cache directory is one piece of the control information, the control information update processing to be described later is called. At this time, similarly to the cache data update processing, the control information update processing is called by setting the redundancy necessity to "unnecessary". The cache allocation capacity management table 412 is updated (the clean cache usage amount is increased due to read). As in the case of the cache hit, the data is read from the cache (step 4006), and transmitted to the host as a response (step 4007).

Figure 10:
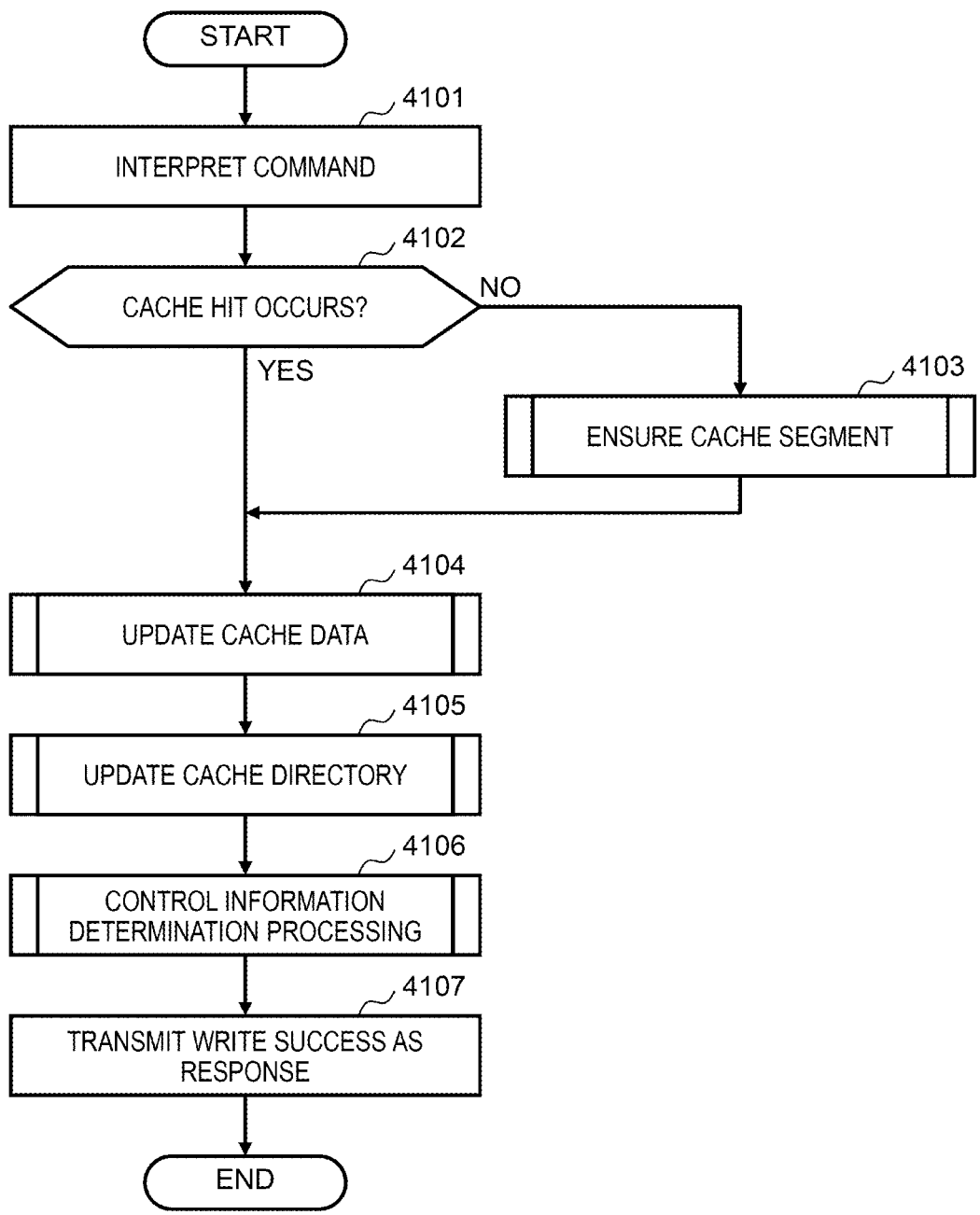
FIG. 10 is a flowchart of write processing.

FIG. 10 is a flowchart showing an example of the write processing. The write processing 522 is executed by the storage controller 520. First, a write command transmitted from the host apparatus 100 is received via the front-end driver 510 and interpreted to obtain a logical volume number and a logical volume address to be written (step 4101). Next, it is determined whether a cache hit occurs (step 4102). Specifically, with reference to the cache directory 411, an entry corresponding to the logical volume number and the logical volume address is searched for in the cache directory 411, and if there is the entry (hit), the cache address is referenced from the entry, processing proceeds to a branch of Yes, and data is stored in the cache (step 4104). At this time, the cache data update processing to be described later is called by setting the redundancy necessity to "necessary".

Next, the corresponding cache directory 411 is updated (step 4105). At this time, since the cache directory 411 is one piece of the control information, the control information update processing to be described later is called. At this time, similarly to the cache data update processing, the control information update processing is called by setting the redundancy necessity to "unnecessary". The cache allocation capacity management table is updated (the dirty cache usage amount is increased due to write). Next, the control information determination processing to be described later is called (step 4106). Finally, write success is transmitted to the host as a response (step 4107).

In the case of the cache miss, the processing proceeds to the branch of No, the cache segment is ensured (4103), and the cache segment is also ensured by calling the control information update processing. At this time, the redundancy necessity is set to necessary. Thereafter, the processing proceeds to step 4104, and subsequent steps are the same as in the case of hit.

Figure 11:
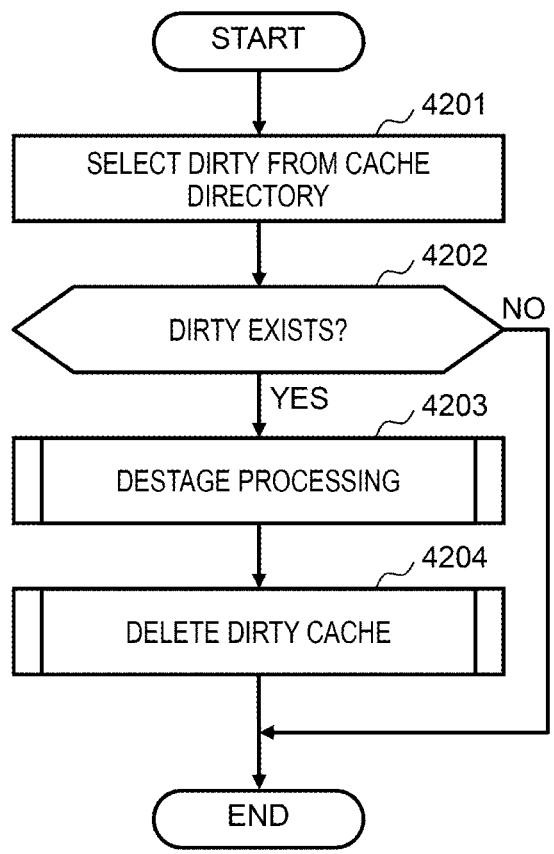
FIG. 11 is a flowchart of non-synchronization destage processing.

FIG. 11 is a flowchart of the non-synchronization destage processing. The non-synchronization destage processing 523 is to search for an entry having an attribute of "dirty" from the cache directory 411 (step 4201), and the processing ends if there is no such an entry (branch of No in step 4202). If there is the entry of dirty (branch Yes), the destage processing is executed for the cache segment (steps 4202 and 4203). The destage processing is processing executed by the data protection controller 530, and is to write data corresponding to the logical volume number/logical volume address to a permanent area on the drive. At this time, data may be stored in a redundant manner using a technique such as mirroring or erasure coding (EC). Thereafter, the dirty cache is deleted from the cache directory 411 (step 4204). At this time, since the cache directory is updated, the control information update processing is called for update by setting the redundancy necessity to necessary. The cache allocation capacity management table 412 is updated.

Figure 12:
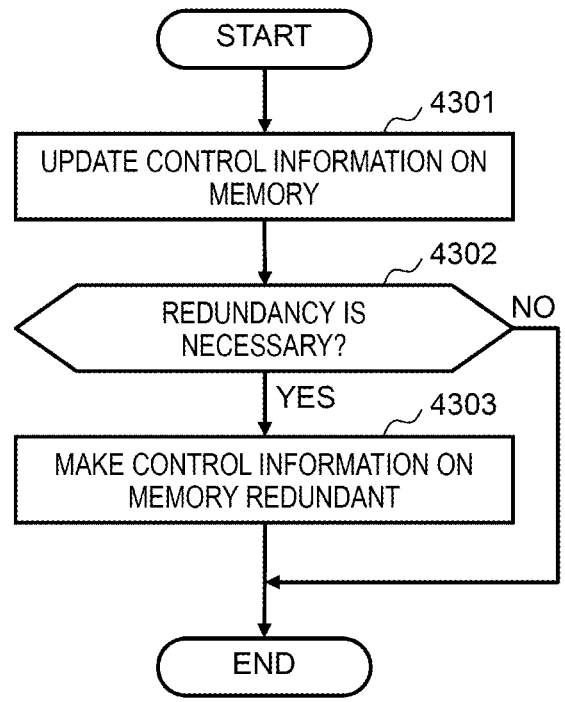
FIG. 12 is a flowchart of control information update processing.

FIG. 12 is a flowchart of the control information update processing. The control information update processing 524 is called when the control information on the memory 302 is updated. When the control information update processing is called, a memory address and a size for specifying control information serving as an update target, an update value, and information indicating the redundancy necessity are dispatched.

First, the control information on the memory is updated (step 4301). Next, the necessity is determined with reference to the dispatched redundancy necessity (step 4302). Only when the redundancy necessity is set to necessary, the control information on the memory is made redundant (4303).

Figure 13:
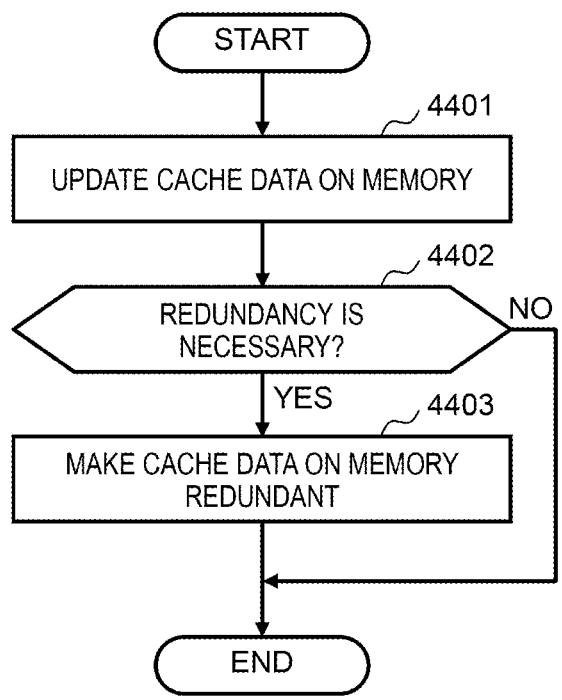
FIG. 13 is a flowchart of cache data update processing.

FIG. 13 is a flowchart of the cache data update processing. Steps 4401 to 4403 are the same as steps 4301 to 4303 except that the update target is the cache data instead of the control information.

Figure 14:
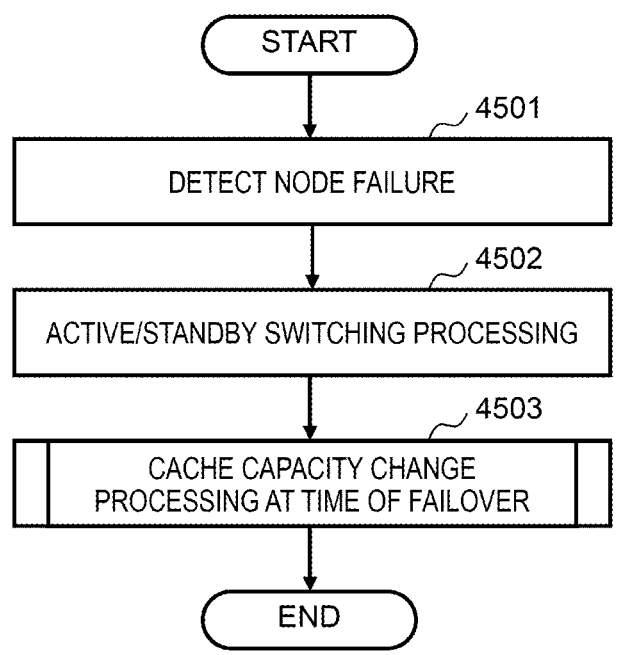
FIG. 14 is a flowchart of processing at the time of failover.

FIG. 14 is a flowchart of processing at the time of failover. The processing is called when a node failure occurs. When the node failure is detected (step 4501), active/standby switching processing is first executed (step 4502). The processing is processing of newly changing one of the standby storage controllers belonging to the same redundancy group as the active storage controller located in the failed node to an active storage controller. The cache capacity change processing at the time of failover is executed for a node including the storage controller that is set to the active mode newly (step 4503). The cache capacity change processing at the time of failover will be described later with reference to FIG. 15.

FIG. 15 is a flowchart of the cache capacity change processing at the time of failover. First, the node including the storage controller 520 that is set to the active mode newly is selected as an adjustment target (step 4601). Next, calculation for a total allocated cache capacity (A) of all storage controllers 520 in the node (step 4602) and calculation for a total dirty cache usage amount (B) of all storage controllers 520 in the node (step 4603) are performed. Next, by (A−B)/2, a target clean cache usage amount is calculated (step 4604). For each storage controller 520 in the node, a total of the own dirty cache usage amount and the target clean cache usage amount is set as the target cache capacity (step 4605).

Finally, the cache capacity adjustment processing is executed for all the storage controllers 520 in the node (step 4606). The cache capacity adjustment processing will be described with reference to FIG. 17.

FIG. 16 shows an example of a method of updating a cache allocation capacity management table in the cache capacity adjustment processing described above. A target cache capacity field is updated and set to 50 GB for both the storage controller 520 in the redundancy group ID0 located in the node ID1 that is set to the active mode newly and the storage controller 520 in the redundancy group ID1 located in the original node ID1 in an active state.

Figure 17:
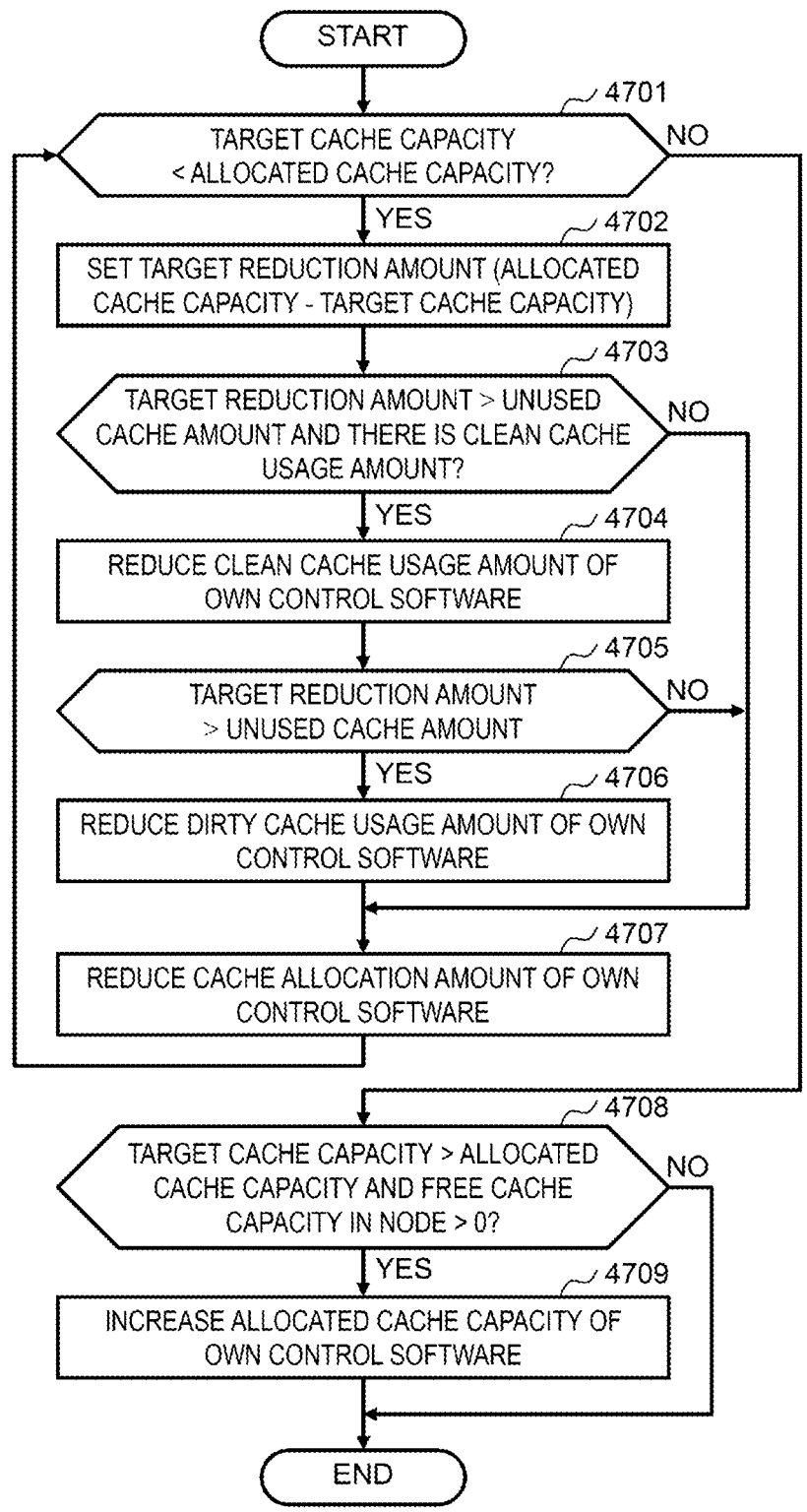
FIG. 17 is a flowchart of cache capacity adjustment processing.

FIG. 17 is a flowchart of the cache capacity adjustment processing. When there is a difference between the target cache capacity and the allocated cache capacity, the cache allocation amount is actually adjusted to compensate for the difference, which is performed by each storage controller 520. The processing is executed by extending the failover described above and is executed periodically.

First, with reference to the cache allocation capacity management table 412, and the target cache capacity and the cache capacity allocated to the own storage controller are compared (step 4701). When the target cache capacity is smaller, a target reduction amount is set to (allocated cache capacity-target cache capacity) (step 4702), and the processing proceeds to step 4703.

In step 4703, it is checked whether the unused cache amount is smaller than the target reduction amount and whether there is the clean cache usage amount. If YES, since the target cache capacity cannot be reduced even though the unused cache is reduced, the clean cache usage amount of the own storage controller is reduced (step 4704). Next, if the unused cache amount does not reach the target reduction amount (step 4705), the dirty cache usage amount of the own storage controller is reduced (step 4706). Then, the unused cache amount increased in steps 4702 to 4706 is released and the cache allocation amount of the own storage controller 520 is reduced (step 4707). The processing returns to step 4701 again.

When the branch of step 4701 is NO, it is determined whether the target cache capacity exceeds the allocated cache capacity (step 4708). When the target cache capacity exceeds the allocated cache capacity and the free cache capacity in the node is larger than zero, the cache capacity allocated to the own storage controller is increased (step 4709).

As a method of reducing the clean cache usage amount in step 4704, an entry with a clean attribute in the cache directory table may be deleted. Even if the clean cache data is lost, there is no problem because the same data is already destaged and it is guaranteed that the clean cache data can be read by being staged again from the drive.

As a method of reducing the dirty cache usage amount in step 4706, for example, there is a method of deleting an entry from the cache directory after destaging the dirty data. Alternatively, destage may be performed to convert the dirty data into clean data, and the clean data may be released again as a clean cache in step 4704.

In the present embodiment, by increasing the cache allocation capacity to the storage controller 520 that is newly changed to the active mode in response to the change from the standby mode to the active mode (failover) due to the node failure, it is possible to maximize the cache utilization efficiency in a normal state with no node failure and to reduce a decrease in a hit rate at the time of the node failure, and the performance is improved.

In the present embodiment, at the time of updating the cache data and the cache directory, the redundancy necessity is set to "unnecessary" in the read processing, and the redundancy necessity is set to "necessary" in the write processing. Since the same data as the data to be stored in the cache data in the read processing is present on the drive, even when the data is lost due to the node failure, the data can be staged again, and there is no problem. In the read processing, since no memory redundancy overhead occurs, the performance is improved.

Embodiment 2

Next, Embodiment 2 will be described.

The present embodiment is an example in which three (triple) storage controllers 520 configure a redundancy group.

Figure 18:
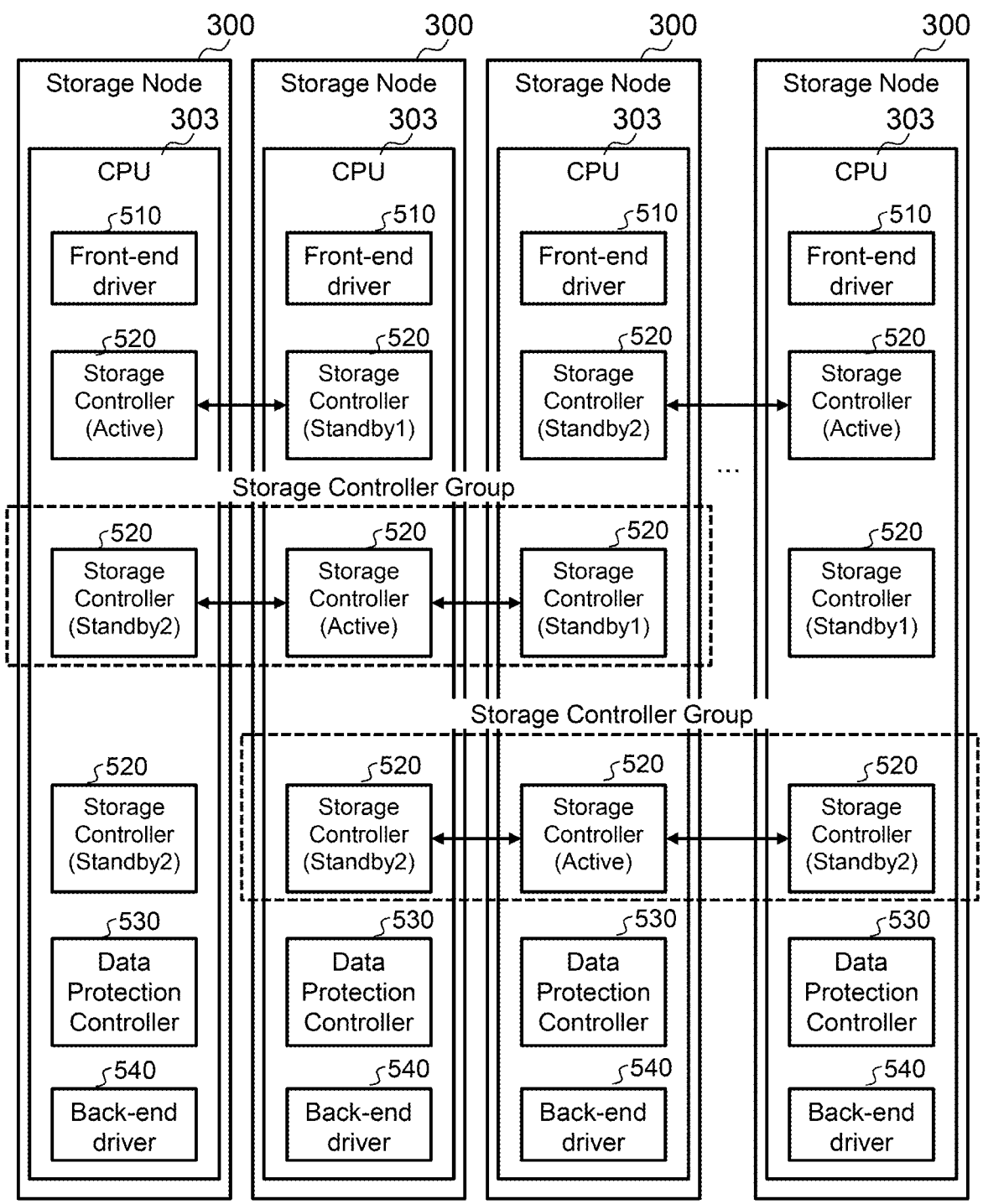
FIG. 18 shows a software module structure according to Embodiment 2.

As shown in FIG. 18, there are three storage controllers 520 that configure each redundancy group, which are located across three nodes and are in an active state, a standby 1 state, and a standby 2 state, respectively.

When a failure occurs in the node in which the active storage controller is located, the processing is failed over to the storage controller in the standby 1 state, and at that time, when the failure further occurs in the node in which the storage controller in the standby 1 state is located, the processing is failed over to the storage controller in the standby 2 state. Therefore, with respect to the failure of the two nodes, a state in which the storage controller 520 accepts IO can be continued. The data itself may also be protected with two parities such as triplication and RAID 6 by a data protection unit.

FIG. 19 shows an example of the cache allocation capacity management table in a case of triplication. Each node includes three storage controllers 520.

FIG. 20 shows cache capacity change processing at the time of failover in the case of triplication. A difference from FIG. 15 is step 4607 instead of step 4604, and when the target cache capacity is calculated, the number of storage controllers 520 is 3 instead of 2.

The present embodiment discloses that the invention can be applied to the case of triplication, and the same applies to the case of quadruple or higher.

Embodiment 3

Figure 21:
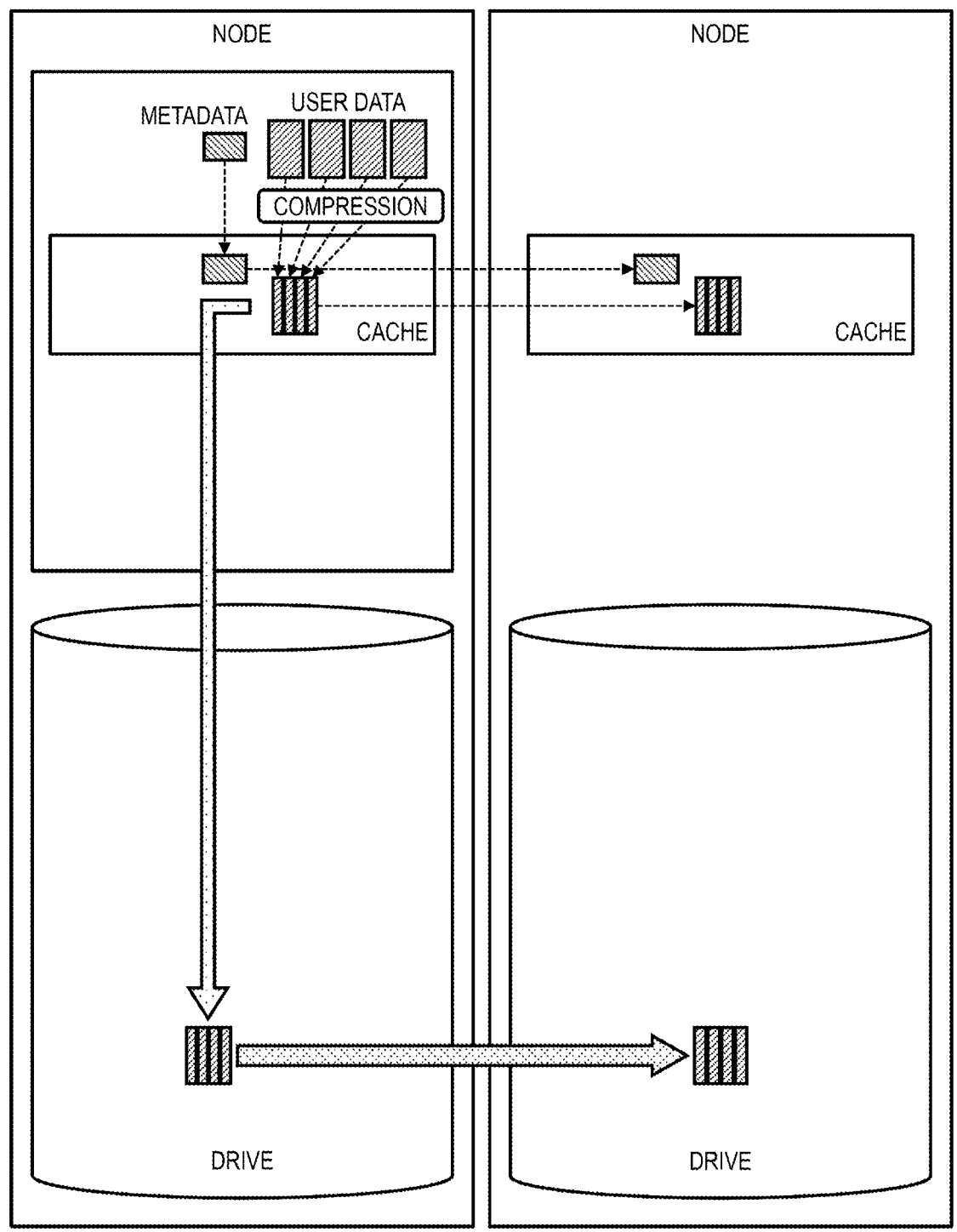
FIG. 21 is an explanatory diagram according to Embodiment 3.

FIG. 21 shows Embodiment 3 of the invention.

Embodiment 3 is an example in which a compression function is supported.

The compression function is an example of various functions supported by the storage controller 520. The compression function is a function of compressing data received from the host 100 according to a data compression algorithm such as LZ4 and storing the compressed data, thereby reducing consumption of a capacity, saving a capacity of a disc, and reducing a cost of the disc.

As shown in FIG. 21, the data received from the host 100 is stored in a cache data area. The processing at this time is similar to the write processing shown in FIG. 10, but is different in that the data to be written is compressed and that writing of the compressed data and metadata indicating a position of the compressed data is involved.

At this time, the compressed data and the metadata is written in the cache data area in an additional writing format. The reason is that, in the compression function, a size of the data received from the host after compression is indefinite (depends on a compression effect), and therefore, even if the compressed data is to be overwritten on old data, the compressed data may be larger in size than the old data and cannot be replaced.

Therefore, an additional writing method is suitable in which a new area is always ensured for write, and an area of the old data is released as a free area. Since the format is the additional writing format, information (metadata) indicating a storage position of the compressed data is necessary. The metadata is also stored in the cache data area.

The compressed data and the metadata stored in the cache data area are stored in the cache data area of the standby storage controller located in another node in synchronization with the host IO (that is, before returning a response to the host). That is, redundancy is achieved.

As described with reference to FIG. 11, in the destage processing executed by the data protection unit in the processing, data can be made redundant by mirroring or erasure coding (EC). FIG. 21 shows an example of mirroring, and redundancy is achieved by transmitting a copy of data to other data.

In the present embodiment, the metadata is also stored in the cache, but the metadata has higher locality, that is, a tendency that the same data is more repeatedly accessed than the user data, so that it can be said that the metadata is data having a high performance improvement effect when being stored in the cache.

Therefore, it is also useful to consider the metadata in the cache capacity change processing shown in FIG. 15. For example, when the target clean cache usage amount is calculated in step 4604 in FIG. 15, the target cache capacity is increased for the storage controller 520 having a large ratio of the metadata to the cache usage amount.

In this case, a ratio of the metadata to the cache data is managed in management of the cache capacity. FIG. 22 shows an example of the cache allocation capacity management table according to the present embodiment.

Unlike the table in Embodiment 1, a distinction between the "metadata" and the "user data" is provided for the fields of the clean cache usage amount and the dirty cache usage amount, and the fields of the clean cache usage amount and the dirty cache usage amount of the cache allocation capacity management table are further managed by being divided into a "clean cache usage amount (metadata)", a "clean cache usage amount (user data)", a "dirty cache usage amount (metadata)", and a "dirty cache usage amount (user data)".

Figure 23:
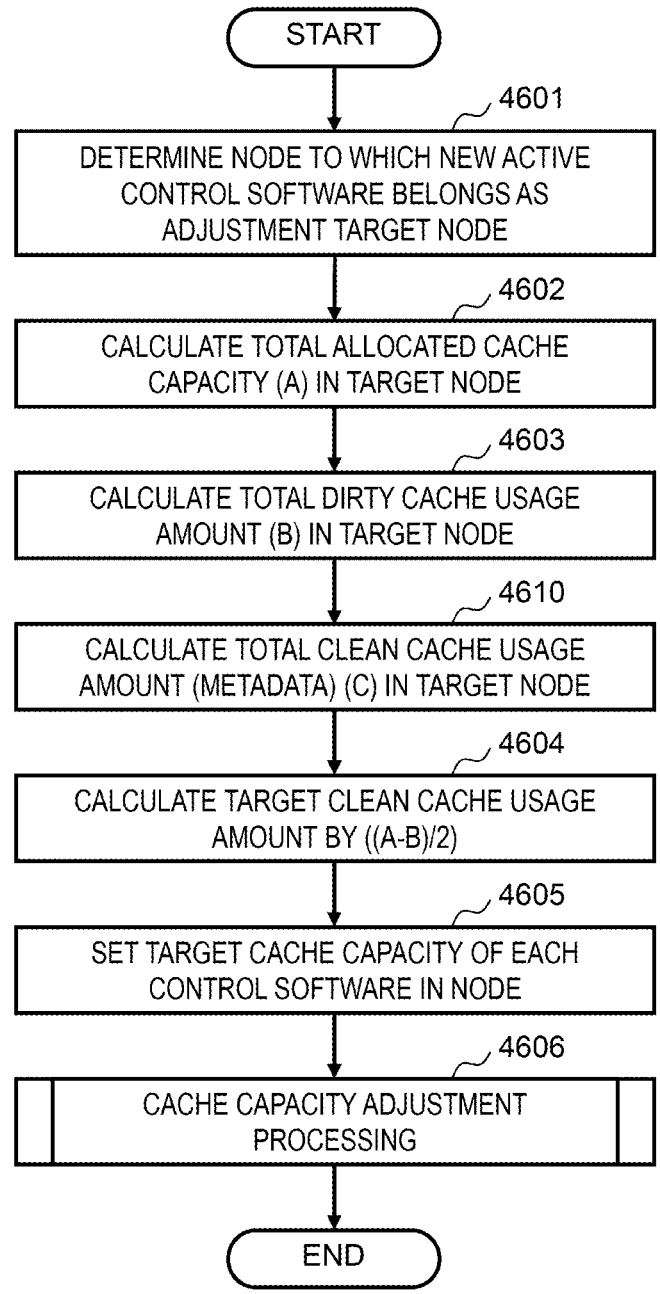
FIG. 23 is a flowchart of cache capacity change processing considering metadata.

FIG. 23 shows the cache capacity change processing at the time of failover in the present embodiment. A difference is that step 4610 is added after step 4603, and the metadata is considered here. In calculation for the target cache amount, for example, a larger cache capacity may be allocated to a node having a large metadata cache amount by adding the clean cache (metadata) amount of each storage controller 520.

Embodiment 4

In the present embodiment, a cache hit rate is also managed in the management of the cache capacity. FIG. 24 shows an example of the cache allocation capacity management table in the present embodiment. A field of "cache hit rate" is provided. The field indicates a percentage of cache hit for each I/O, and has a value obtained by counting the percentage of cache hit in IO processing (a percentage of Yes in step 4002 in FIG. 9 or step 4102 in FIG. 10).

Figure 25:
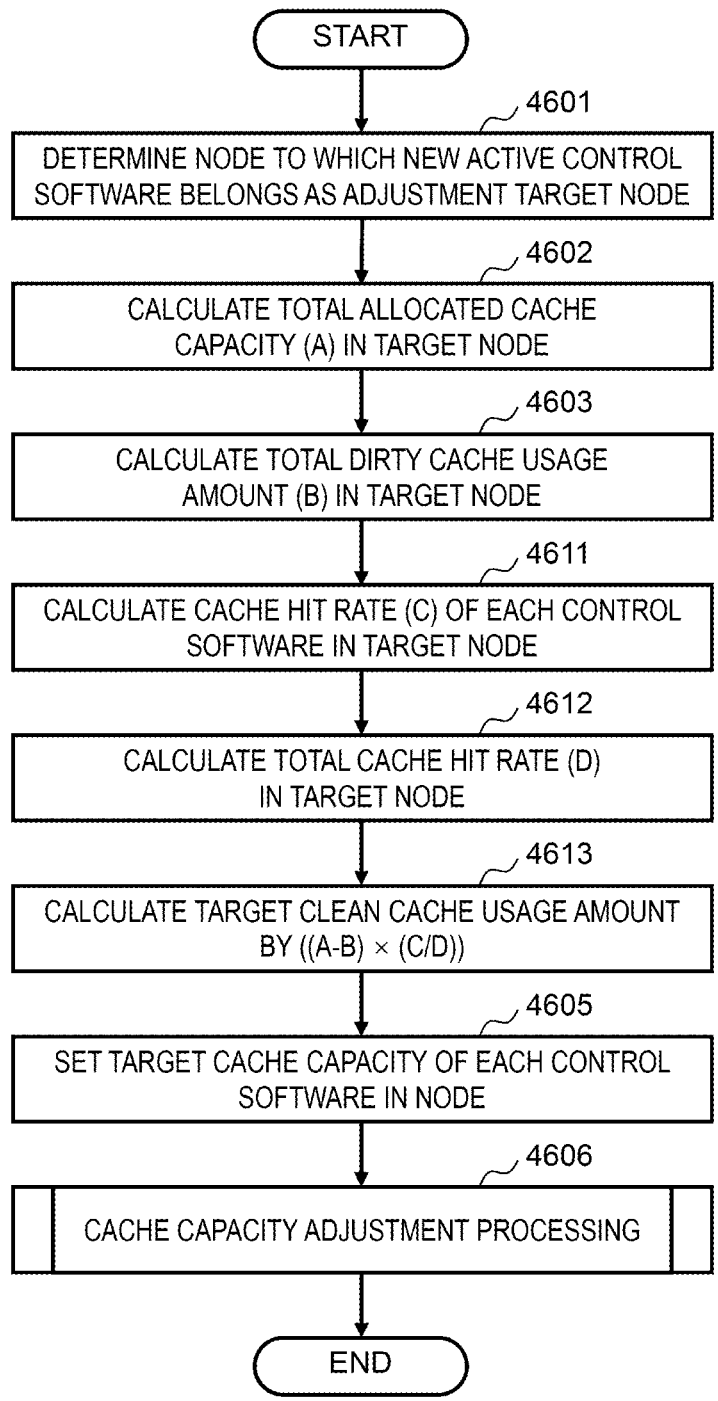
FIG. 25 is a flowchart of cache capacity change processing considering the cache hit rate.

FIG. 25 shows an example of the cache capacity change processing at the time of failover in consideration of the hit rate. After step 4603, a cache hit rate (C) for each storage controller 520 in each node is totaled (step 4611), and a total cache hit rate (D) of the storage controller 520 in each node is totaled (step 4612), and the target clean cache usage amount is calculated by multiplying C/D by (A-B) to allocate more cache capacity to the storage controller 520 having a high hit rate (step 4613).

Embodiment 5

In the present embodiment, the cache capacity is adjusted with failback as a trigger.

Figure 26:
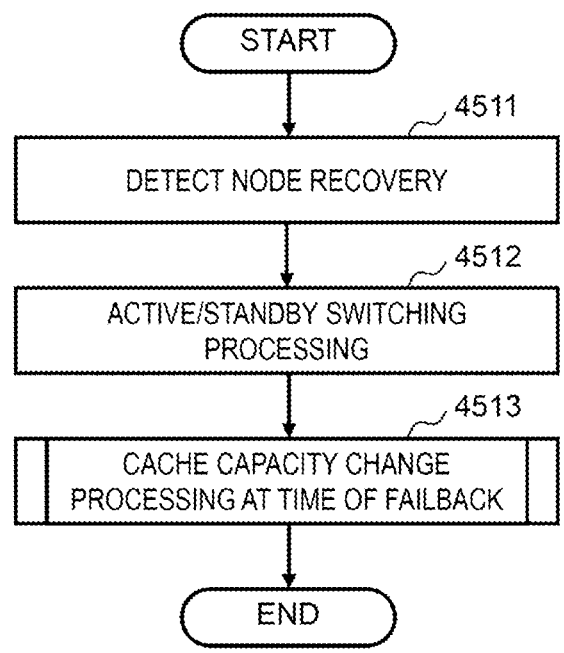
FIG. 26 is a flowchart of failback processing.

FIG. 26 shows processing at the time of the failback. The failback is processing in which after a node failure, the node is recovered (the failure of the node is removed or the node is replaced), and then the storage controller 520 in the node is activated again (activated in a standby state), and the storage controller 520 located in the node is returned to the active mode. In step 4511, recovery of the node is detected, and in step 4512, the storage controller 520 in the node is switched from the standby mode to the active mode. After that, the cache capacity change processing at the time of failback is called (step 4513). FIG. 27 is a flowchart showing the cache capacity change processing at the time of the failback. The flowchart is different from that in FIG. 15 in that A-B is set as the target cache amount considering that the recovery node is set as the target in step 4601 and there is one active storage controller 520 in the node in the calculation of the target cache capacity in step 4607.

In the failback shown in FIG. 27, the active node is moved from a failover destination node to the recovery node. With the failback, in the failover destination node, the storage controller 520 that is changed from the standby mode to the active mode due to the failover is returned to the standby mode. That is, since the memory allocation amount is increased for the storage controller 520 which is set to the active mode due to the failover, an allocated memory capacity is reduced and returns to an original allocated memory capacity by the failback.

In the flow shown in FIGS. 15, 23, 25, and 27, in the step of obtaining the target cache capacity, when the total dirty cache usage amount (B) is subtracted from the total cache allocation amount (A), by subtracting more than the total dirty cache usage amount (B), the standby storage controller may have some margin instead of the exact dirty cache usage amount. In this manner, it is possible to meet a further cache demand in the IO in the active storage controller configuring the redundancy group.

As described above, the disclosed storage system includes the plurality of storage nodes 300 each including the processor (CPU 303) and the memory 302, and a storage device (drive 301), each of the plurality of storage nodes 300 includes the storage controllers 520 configured to run on the processor, the plurality of storage controllers 520 include an active storage controller 520 configured to process data output to and received from the storage device, and a standby storage controller 520 configured to take over the processing of the data from the active storage controller 520, each of the active storage controller 520 and the standby storage controller 520 is allocated with a storage area of the memory, and the storage node 300 changes an amount of a memory capacity allocated for the storage controller 520 of the self-node when a state of the storage controller 520 is switched between a standby state and an active state.

Therefore, the storage system can effectively use the memory of the node and a storage system having both a high performance and a high reliability can be implemented.

As an example, in the storage system, when the state of the storage controller 520 is switched from the standby state to the active state, the memory capacity allocated to the storage controller 520 is increased In the storage system, when the memory capacity is increased, a memory capacity allocated to another storage controller 520 of the same storage node 300 is reduced.

As an example, in the storage system, when the state of the storage controller is switched from the active state to the standby state, the memory capacity allocated to the storage controller is reduced.

In this way, in the storage system, it is possible to freely change the allocated amount of the memory and effectively use the memory in response to the switching of the state of the storage controller caused by failover or failback.

In the storage system, a redundancy group includes the active storage controller 520 and the standby storage controller 520 configured to take over the processing, the plurality of storage controllers 520 in the same redundancy group are located in different nodes, and a plurality of the storage controllers 520 belonging to different redundancy groups are located in the same node, and the data is made redundant and stored in the storage device by the plurality of storage controllers in the redundancy group.

A cache allocated to the storage controller 520 includes a dirty cache configured to store data to be written to the storage device and a clean cache configured to store data read from the storage device, and a storage amount of the clean cache of the active storage controller is larger than that of the standby storage controller.

Therefore, effective use of the memory can be implemented by reducing the clean cache in a standby system while ensuring the performance by leaving a large amount of clean cache in the active system.

The storage node 300 subtracts a total capacity of the dirty caches held by all of the storage controllers 520 of the self-node from a total capacity of the caches held by all of the storage controllers 520 of the self-node, divides the subtraction result by the number of the storage controllers 520 of the self-node, and adds a capacity of the dirty cache of each of the storage controllers 520 to the obtained value to calculate a target cache capacity of each of the storage controllers 520.

Therefore, it is possible to optimize the memory by reducing the clean cache while ensuring the dirty cache.

The storage node 300 is capable of compressing user data and cache data contains metadata related to the compression.

The storage node 300 subtracts a total capacity of the dirty caches held by all of the storage controllers 520 of the self-node and a total capacity of the clean caches for metadata held by all of the storage controllers 520 of the self-node from a total capacity of the caches held by all of the storage controllers 520 of the self-node, divides the subtraction result by the number of the storage controllers 520 of the self-node, and adds, to the obtained value, a capacity of the dirty cache and a capacity of the clean cache for the metadata of each of the storage controllers 520 to calculate a target cache capacity of each of the storage controllers 520.

Therefore, the memory efficiency can be improved when the compression is used.

The storage node 300 sets a target cache capacity for each of the storage controllers 520 of the self-node, and reduces, when a cache capacity of a certain one of the storage controllers 520 is larger than the target cache capacity, the cache capacity of the storage controller.

At this time, the storage node 300 preferentially reduces the clean cache to reduce the cache capacity, and destages the dirty cache to reduce the cache capacity when it is necessary to further reduce the cache capacity after the clean cache is completely reduced.

Therefore, the effective use of the memory can be implemented while deleting the dirty cache as necessary.

The invention is not limited to the embodiments described above, and includes various modifications. For example, the embodiments described above have been described in detail for easy understanding of the invention, and the invention is not necessarily limited to those including all of the configurations described above. Not only deletion of such a configuration, but also replacement and addition of the configuration are possible.

What is claimed is:

1. A storage system comprising:
a plurality of storage nodes each including a processor and a memory; and
a storage device, wherein
each of the plurality of storage nodes includes a storage controller configured to run on the processor,
the plurality of storage controllers include;
an active storage controller configured to process data output to and received from the storage device; and
a standby storage controller configured to take over the processing of the data from the active storage controller,
each of the active storage controller and the standby storage controller is allocated with a storage area of the memory,
said each of the plurality of storage nodes changes an amount of a memory capacity allocated for the storage controller of a self-node of said each of the plurality of storage nodes when a state of the storage controller of said each of the plurality of storage nodes is switched between a standby state and an active state,
wherein a redundancy group includes the active storage controller and the standby storage controller configured to take over the processing,
wherein the plurality of storage controllers in a same redundancy group are located in different nodes and a plurality of the storage controllers belonging to different redundancy groups are located in a same node,
wherein the data is made redundant and stored in the storage device by the plurality of storage controllers in the redundancy group
wherein a cache allocated to the storage controller includes a dirty cache configured to store data to be written to the storage device and a clean cache configured to store data read from the storage device, wherein a storage amount of the clean cache of the active storage controller is larger than that of the standby storage controller, and wherein the storage node subtracts a total capacity of the dirty caches held by all of the storage controllers of the self-node from a total capacity of the caches held by all of the storage controllers of the self-node, divides a subtraction result by a number of the storage controllers of the self-node, and adds a capacity of the dirty cache of each of the storage controllers to an obtained value to calculate a target cache capacity of each of the storage controllers.

2. The storage system according to claim 1, wherein when the state of the storage controller is switched from the standby state to the active state, the memory capacity allocated to the storage controller is increased.

3. The storage system according to claim 1, wherein when the state of the storage controller is switched from the active state to the standby state, the memory capacity allocated to the storage controller is reduced.

4. The storage system according to claim 1, wherein said each of the plurality of storage nodes includes one active storage controller and two standby storage controllers, and when one of the standby storage controllers is switched to the active storage controller, a memory capacity to be used by another of the standby storage controllers to hold the clean cache is reduced.

5. The storage system according to claim 1, wherein the storage node is capable of compressing user data and cache data contains metadata related to the compression.

6. The storage system according to claim 1, wherein the storage node sets the target cache capacity for each of the storage controllers of the self-node, and reduces, when a cache capacity of a certain one of the storage controllers is larger than the target cache capacity, the cache capacity of the storage controller.

7. The storage system according to claim 2, wherein when the memory capacity is increased, a memory capacity allocated to another storage controller of the same storage node is reduced.

8. The storage system according to claim 6, wherein the storage node preferentially reduces the clean cache to reduce the cache capacity, and destages the dirty cache to reduce the cache capacity when it is necessary to further reduce the cache capacity after the clean cache is completely reduced.

9. A storage system comprising:
a plurality of storage nodes each including a processor and a memory; and
a storage device, wherein
each of the plurality of storage nodes includes a storage controller configured to run on the processor,
the plurality of storage controllers include:
an active storage controller configured to process data output to and received from the storage device; and
a standby storage controller configured to take over the processing of the data from the active storage controller,
each of the active storage controller and the standby storage controller is allocated with a storage area of the memory, and
said each of the plurality of storage nodes changes an amount of a memory capacity allocated for the storage controller of a self-node of said each of the plurality of storage nodes when a state of the storage controller of said each of the plurality of storage nodes is switched between a standby state and an active state,
wherein a redundancy group includes the active storage controller and the standby storage controller configured to take over the processing,
wherein the plurality of storage controllers in a same redundancy group are located in different nodes and a plurality of the storage controllers belonging to different redundancy groups are located in a same node,
wherein the data is made redundant and stored in the storage device by the plurality of storage controllers in the redundancy group
wherein a cache allocated to the storage controller includes a dirty cache configured to store data to be written to the storage device and a clean cache configured to store data read from the storage device,
wherein a storage amount of the clean cache of the active storage controller is larger than that of the standby storage controller, and
wherein the storage node subtracts a total capacity of the dirty caches held by all of the storage controllers of the self-node and a total capacity of the clean caches for metadata held by all of the storage controllers of the self-node from a total capacity of the caches held by all of the storage controllers of the self-node, divides a subtraction result by a number of the storage controllers of the self-node, and adds, to an obtained value, a capacity of the dirty cache and a capacity of the clean cache for the metadata of each of the storage controllers to calculate a target cache capacity of each of the storage controllers.

\* \* \* \* \*